(12) United States Patent
Harrington

(10) Patent No.: US 6,894,716 B1
(45) Date of Patent: May 17, 2005

(54) METHOD AND APPARATUS FOR IDENTIFYING A POSITION OF A PREDETERMINED OBJECT IN FREE SPACE USING A VIDEO IMAGE

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/410,520

(22) Filed: Oct. 1, 1999

(51) Int. Cl.[7] ................................................ H04N 7/18

(52) U.S. Cl. ............................ 348/86; 348/94; 348/95; 348/135; 348/141; 348/143; 348/169; 348/207; 345/179; 345/180; 700/302

(58) Field of Search ......................... 348/86, 61, 94, 348/95, 135, 140, 141, 142, 143, 169, 207, 116, 82; 700/302; 345/179, 180, 568, 856, 104, 167, 545; 600/414; 250/254; 356/152, 141, 39

(56) References Cited

U.S. PATENT DOCUMENTS

| | | | | |
|---|---|---|---|---|
| 4,238,828 A | * | 12/1980 | Hay et al. | 348/135 |
| 4,857,902 A | * | 8/1989 | Naimark et al. | 348/116 |
| 4,977,315 A | * | 12/1990 | Purcell | 345/104 |
| 5,267,014 A | * | 11/1993 | Prenninger | 348/135 |
| 5,517,990 A | * | 5/1996 | Kalfas et al. | 600/414 |
| 6,519,029 B1 | * | 2/2003 | Hedges et al. | 356/141.4 |

FOREIGN PATENT DOCUMENTS

JP 2001167257 * 6/2001 ............ G06T/1/00

OTHER PUBLICATIONS

Billinghurst, Mark; Weghorst, Suzane and Furness, Tom III, "Wearable Computers for Three Dimensional CSCW", International Symposium on Wearable Computers, Oct. 13–14, 1997, Cambridge, MA.

Fitzmaurice, George W. and Buxton, William, "An Empirical Evaluation of Graspable User Interfaces: towards specialized, space–multiplexed input", Proceedings of CHI '97 Conference on Human Factors in Computing Systems, pp. 43–50.

Fitzmaurice, George W., Ishii, Hiroshi and Buxton, William, "Bricks: Laying the Foundations for Graspable User Interfaces", Proceedings of Human Factors in Computing Systems, CHI '95, pp. 432–449.

Robinson, Peter; Sheppard, Dan; Watts, Richard; Harding, Robert and Lay, Steve,"A framework for interacting with paper", The Eurographics Association 1997. Published by Blackwell Publishers, Malden, MA 02148, USA., vol. 16, (1997), No. 3, pp. C–329–C–334.

* cited by examiner

*Primary Examiner*—Shawn S. An
(74) *Attorney, Agent, or Firm*—Fay, Sharpe, Fagan, Minnich & McKee, LLP

(57) ABSTRACT

A method and apparatus is disclosed for identifying a position of an object in free space using a video image wherein the object is comprised of at least three equidistantly spaced, co-linear beads. The video image is captured on a view plane of a video camera system and represented on a frame memory thereof. Relative positions of the beads on the frame memory are determined and corresponding coordinate positions of the beads in the free space are calculated based upon the determined relative spacings and known camera system geometries. The object may also include an alignment indicator so that the pointing direction of the object can be determined.

10 Claims, 1 Drawing Sheet

METHOD AND APPARATUS FOR IDENTIFYING A POSITION OF A PREDETERMINED OBJECT IN FREE SPACE USING A VIDEO IMAGE

BACKGROUND OF THE INVENTION

This invention relates generally to a method and apparatus for viewing and interacting with real world items such as a pointing wand, wherein the pointing orientation of the wand can be detected by a computer system from a video camera image of the object. More particularly, the object includes an alignment indicator representative of a pointing direction and at least three equidistantly spaced co-linear points whose inter-spacing distance is known. Observation of the object by the video camera, in combination with known camera geometric dimensions provides a basis for converting the projected two-dimensional image of the object into a three-dimensional coordinate definition of the object in a free space. The invention is particularly applicable to a processing system where a three-dimensional object such as a pointing wand is intended to be used as an interface for communicating data or instructions from a user to the system. However, it will be appreciated to those of ordinary skill in the art that the invention could be readily adapted for use in other environments as, for example, where three-dimensional imaging or display methods are advantageously employed for communication or other informational purposes.

The ubiquitous use of PC workstations and the fact that such workstations will increasingly include a video camera for data input and communication presents an opportunity for expanding the nature and forms of data input to the system and interface tools for implementation of such communication.

For many years now it has been possible to present three-dimensional views of computer generated images. This is done by presenting a different view to each eye of the viewer. One method of doing this is to alternate the two views in time on a CRT display while the viewer wears special LCD shutter glasses that synchronously hide one image or the other from the viewer's left and right eyes. Other methods such as head-mounted displays that present different views to each eye are also available. With the help of this display technology the user can see a three-dimensional virtual construction suspended before his or her eyes. However, one would also like to interact with such constructions, to point to locations on it or to add to it. For such interaction, a three-dimensional locating device would be most useful. Such a device can seemingly provide the computer with an indicated position in the three-dimensional space between the viewer and the system display.

A particular problem with interfacing with such a locating device is position and orientation identification of the device in three dimensions. A single camera will only have a two-dimensional view plane. A plurality of cameras can provide the necessary three-dimensional data input but relative camera position tuning, as well as the cost of providing more than a single camera, presents an incentive towards developing a single camera system.

The present invention contemplates an interaction tool for the three-dimensional representations of position and pointing orientation based on the captured image from a single video camera of a kind currently readily available in many present PC workstations.

BRIEF SUMMARY OF THE INVENTION

In accordance with the present invention, a method and apparatus is provided for identifying a location of an interface tool such as a wand for indicating a position and pointing direction of the wand in a three-dimensional free space where a virtual image appears to the user in the free space. The wand comprises an interface tool for interacting with the image. The position and pointing direction of the wand are determined from a representative image of the wand in a video camera system. The wand is comprised of an alignment indicator and at least three equidistantly spaced co-linear points which are projected on to a view plane of the video camera. The relative positions of the co-linear points are detected within the view plane as is the alignment of the points from the alignment indicator. Corresponding coordinate positions of the real object in free space are calculated based upon the detected relative positions and known camera geometric dimensions. In particular, the distance between a view point and a view plane is used for computing the object distance between the view plane and the object location in the free space.

In accordance with another aspect of the present invention, the detecting comprises detecting pixel location of the points on a frame memory representing the image.

In accordance with a more limited aspect of the present invention, the points comprise beads of a predetermined hue readily distinguishable from an anticipated background setting in the particular free space.

An important benefit obtained from the present invention is identification of the relative position of a three-dimensional object in a computer system based upon a two-dimensional captured image of the object.

A further benefit is the identification of a relative position of an interface tool for communicating user instructions or data to an associated computer system.

Other benefits and advantages of the subject system and method will become apparent to those skilled in the art upon a reading and understanding of the specification.

BRIEF DESCRIPTION OF THE DRAWINGS

The invention may take physical form in certain parts and steps and arrangements of parts and steps, the preferred and alternative embodiments of which will be described in detail in the specification and illustrated in accompanying drawings which form a part hereof and wherein.

DETAILED DESCRIPTION OF THE INVENTION

Figure 1:
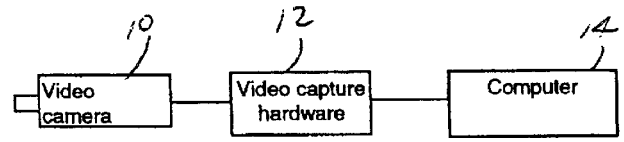
FIG. 1 comprises a simplified block diagram of the basic structural elements of the invention.

Referring now to the drawings wherein the showings are for purposes of illustrating the preferred and alternative embodiments of the invention only and not for purposes of limiting same, the invention comprises a special wand W (FIG. 2) and software modules (FIG. 3) that work with a video camera 10, video capture hardware 12 and a computer 14 (FIG. 1) for identifying the position of the wand in a three-dimensional free space. The wand is a rod with three beads on it, two 16, 18 at the ends and one 20 in the center. The beads are given a distinctive color or hue (e.g., florescent green) that can be easily distinguished by the system from the typical background in the free space. The beads need be large enough to be easily seen in the captured video image but not so large as to be awkward to manipulate. It is possible to distinguish one end of the wand from the other by some means such as giving each half of the connecting rod a different color or insignia which can serve as an alignment indicator for the pointing direction of the wand W.

Figure 3:
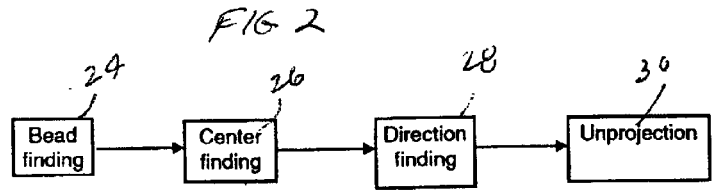
FIG. 3 is a block diagram of the operational modules for implementing the invention.

The video capture hardware 12 produces a sequence of captured video images that can be analyzed by software running on the computer. A block diagram of the software modules for the analysis software is shown in FIG. 3.

Figure 4:
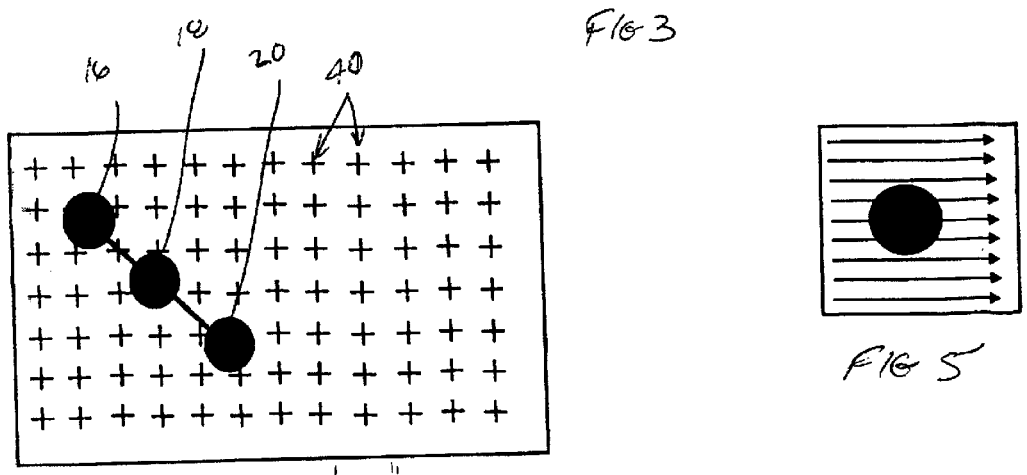
FIG. 4 is a simplified schematic diagram representing a sampling scheme for identifying wand position and relative positions of indicia beads thereon within a frame memory representing the video image of the wand.

The first stage in the software processing is to locate 24 the beads on the view plane within the image. This can be done by examining the pixel values of the image on the frame memory to determine whether or not they match the color of the beads. Instead of trying to match the full color of the bead one can just look for a match in hue. This overcomes the problem of shadings due to lighting variations. The hue can be defined as the ratio of the chrominance components when the color is expressed in a luminance/chrominance color space (e.g. YES, L*a*b* or L*u*v*). One need not examine every pixel if the beads are large enough and near enough to the camera that they cover a multiple pixel area. The image can then be sampled at a rate sufficiently for at lease one sample in each bead-sized area, and preferably at about twice this rate to guarantee that the bead will be found. The actual sample rate depends upon the properties of the system. FIG. 4 illustrates the sampling of the image where each "+" 40 represents a sampling point from the frame memory 42 so that the beads can be found.

Figure 5:
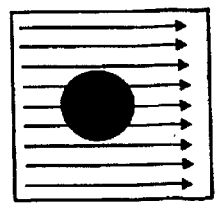
FIG. 5 is a simplified schematic diagram of an analytical method for identifying a center of an indicia bead of the wand; and, FIG. 6 is a geometric diagram to assist the explanation of the geometric computations for converting detected positions of the wand in the video image to corresponding coordinates in the free space, based upon known system geometries.

Once the beads have been found, the next step is to determine 26 the locations of their centers. This can be done by finding the center-of-mass of all pixels in the region that have the desired hue. One could, for example examine each pixel in a square with side length twice the largest expected imaged bead diameter, centered on the bead location, and find the average position for all pixels in the square satisfying the hue test. FIG. 5 illustrates this method. Alternatively, one could start with the bead location and examine neighboring pixels in a "flood-fill" fashion to locate those with the desired hue. For example, one could step left and right from the starting point collecting pixels until values that do not match the bead hue are reached. From the center of this run of bead pixels one can move up a scan line and repeat the process. One can continue moving up until a scan is encountered without a bead-colored pixel. Likewise one could move down to pixels below until bead colored pixels can no longer be found. Collecting pixels means summing their x and y positions respectively so that an average position can be calculated.

Having found the centers of the bead pixels, one can apply a test to determine if the center-points are in fact co-linear to within some tolerance as expected. If the points are not co-linear then one might assume that the detection has failed and that objects other than the wand have been misinterpreted. In this event no further attempt at locating the wand should be attempted.

Figure 2:
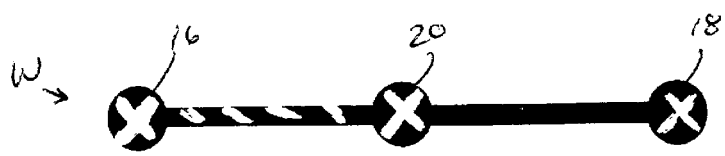
FIG. 2 is a plan view of a wand including indicia beads whose position and orientation are to be detected by the system of FIG. 1.

The next step in the process is determining 28 which end of the wand is the pointing end. If the rod halves are color coded, this can be done by examining the hue of the pixels along the line between bead centers. One can, for example, count the pixels that match the front-end hue and the back-end hue along the line between end bead and center bead. The dominant color determines whether this is a front end or, back end. The distinctive cross-sectional linings in FIG. 2 are intended to represent possible different colors. The last stage is to convert 30 from the projected image coordinates to the real world position. The conversion comprises an "unprojection" of the projected image on the frame memory through geometric calculations based upon the determined relative spacings of the beads thereon and known system geometries.

Figure 6:
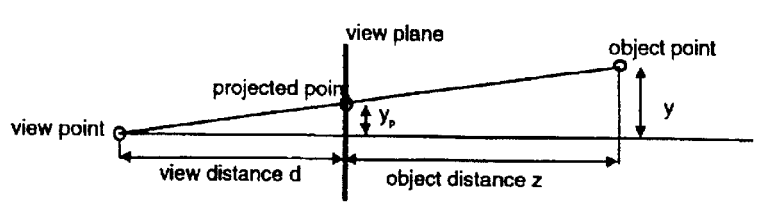

We assume the following model for the projection: the captured image will appear the same as if drawn on a two-dimensional view plane located a view distance d from a view point. The location of a point in the view plane that corresponds to a point on the object is the intersection of the view plane with the line from the object point to the view point (see FIG. 6).

With this model the object point height y is related to the projected point height $y_p$ as $$y=y_p(z+d)/d$$

or $$y=B(z+d) \text{ where } B=y_p/d$$

Similarly, the horizontal position of the object x is related to its projected position $x_p$ by $$x=A(z+d) \text{ where } A=x_p/d$$

Now suppose we have three points on the object equally spaced along a straight line. Labeling these points 1, 2 and 3, and assuming they correspond to the beads 16, 18, 20 with the distance between points 1 and 3 called D, the Eucledian distance equation gives $$D^2=(x1+x3)^2+(y1-y3)^2+(z1-z3)^2$$

Since point 2 is halfway between point 1 and 3 we know that $$x2=(x1+x3)/2 \; y2=(y1+y3)/2 \; z2=(z1+z3)/2$$

and since the points are on a straight line we also know that $$x1-x2=x2-x3 \text{ and } y1-y2=y2-y3$$

giving $$A1(z1+d)-A2((z1+z3)/2+d)=A2((z1+z3)/2+d)-A3(z3+d)$$

and $$B1(z1+d)-B2((z1+z3)/2+d)=B2((z1+z3)/2+d)-B3(z3+d)$$

solving these equations for (z1+d) gives $$(z1+d)=g(z3+d)$$

where $$g=(A3-A2)/(A2-A1)=(B3-B2)/(B2-B1)$$

Using this to remove z1+d from the distance equation allows us to solve for z3+d $$z3+d=D/(A3-gA1)^2+(B3-gB1)^2+(1-g)^{1/2}$$

We therefore have the tools to solve for the z positions of the object points, and from them the x and y coordinates.

Note that we have described a method where the three-dimensional world coordinates are calculated in the same units as the two-dimensional captured image coordinates. It is likely that one will be given image coordinates such as pixels and prefer world coordinates such as inches. One therefore needs to apply a simple scaling factor that can be determined empirically for the particular system, along with properties such as the view-distance d.

The three-dimensional position of the end beads along with the knowledge of which bead is the front end is sufficient to provide the location or pointing promised by this invention.

To guard against erroneous results that could occur if the pixels are misidentified as belonging to the beads along the wand, one can check for reasonableness of the resulting position values. The values can be compared to maximum and minimum expected coordinates and points that lie outside the selected range can be ignored or tagged as erroneous.

The invention has been described with reference to preferred and alternative embodiments. Obviously, modifications and alterations will occur to others upon the reading and understanding of this specification. It is my intention to include all such modifications and alterations in so far as they come within the scope of the appended or the equivalents thereof.

Having thus described my invention, I now claim:

1. A method for determining a location of a wand in a preselected free space from a video image of the wand, wherein the wand comprises three equidistantly-spaced, co-linear beads, comprising steps of:

capturing the video image of the wand on a view plane of a video camera system wherein the image is represented by a frame memory including relative positions of the beads;

determining centers of the beads on the view plane and relative spacings between the centers; and, calculating coordinate positions of the beads in the free space based upon the relative spacings and known camera system geometries of generating the video image.

2. The method as defined in claim 1 wherein the wand communicates a pointing direction in an augmented-reality display system and the capturing includes detecting pixel location on the view plane of the beads on the wand.

3. The method as defined in claim 2 wherein the beads comprise a predetermined color and the determining includes detecting the pixel locations representing a property of the color.

4. The method defined in claim 3 wherein the color property is at least hue.

5. The method as defined in claim 2 wherein the determining includes finding a center pixel location of each of the beads.

6. The method as defined in claim 1 wherein known camera geometric dimensions comprise a given distance between a view point and the view plane of the video camera, and the calculating includes converting relative positions of the beads based on the given distance and the known spacing of the beads, to an object distance in the free space between the wand and the view plane.

7. The method as claimed in claim 1 wherein the wand includes an alignment indicator and the calculating includes determining a pointing direction of the wand from the alignment indicator and the coordinate positions of the beads.

8. The method as claimed n claim 7 wherein the beads comprise a distinctive indicia from a background setting of the video image and the determining includes recognizing the distinctive indicia.

9. The method as claimed in claim 1 wherein the calculating comprises unprojecting the video image and verifying that the coordinate positions are reasonable representations of the wand in the free space.

10. The system as defined in claim 1 wherein the calculating further includes means for verifying that the coordinate positions are consistent with a plausible free space position of the wand.

* * * * *